United States Patent [19]

Kikukawa

[11] Patent Number: 4,941,109

[45] Date of Patent: Jul. 10, 1990

[54] METHOD OF EFFECTIVELY PERFORMING A FEED OPERATION AND PRINTING APPARATUS FOR REALIZING THE METHOD

[75] Inventor: Shingo Kikukawa, Oome, Japan

[73] Assignee: Kabushiki Kaisha Toshiba, Kawasaki, Japan

[21] Appl. No.: 855,102

[22] Filed: Apr. 23, 1986

[30] Foreign Application Priority Data

Apr. 24, 1985 [JP] Japan .................................. 60-86469

[51] Int. Cl.[5] .............................................. G06F 3/12

[52] U.S. Cl. .................................................. 364/519

[58] Field of Search ................ 364/519, 900 MS File; 400/3, 252, 303, 319, 356, 551, 711, 712, 185–187, 323, 550; 101/43, 53

[56] References Cited

U.S. PATENT DOCUMENTS

| | | | |
|---|---|---|---|
| 3,904,014 | 9/1975 | Lipo et al. | 400/711 X |
| 4,539,653 | 9/1985 | Bartlett et al. | 364/900 |
| 4,571,100 | 2/1986 | Ueno et al. | 364/519 X |
| 4,644,372 | 2/1987 | Hirota | 400/712 X |
| 4,698,755 | 10/1987 | Okazaki et al. | 364/519 |

*Primary Examiner*—Gary V. Harkcom
*Assistant Examiner*—Mark K. Zimmerman
*Attorney, Agent, or Firm*—Finnegan, Henderson, Farabow, Garrett, and Dunner

[57] ABSTRACT

In a printing apparatus, a feed controller initializes total feed data stored in a memory in response to an initialize instruction input thereto. The total feed data indicates a total number of lines to be totally fed and a direction to be fed. The controller updates the total feed data by feed data each time a feed instruction is input thereto. The feed data is designated by the feed instruction and indicates the number of lines to be fed and a direction to be fed. The controller supplies the feed execution instruction to a feed unit in response to a printing instruction input thereto. The feed unit is responsive to a feed execution instruction input thereto and feeds a continuous paper such as a fanfold paper in accordance with the total feed data and resets the total feed data when the continuous paper is fed. Thus, the printing apparatus performs a feed operation for the continuous paper.

19 Claims, 3 Drawing Sheets

METHOD OF EFFECTIVELY PERFORMING A FEED OPERATION AND PRINTING APPARATUS FOR REALIZING THE METHOD

BACKGROUND OF THE INVENTION

The present invention relates to a method of effectively performing a feed operation for a continuous paper and a printing apparatus for practicing the method.

In a conventional printing apparatus, reverse paper feed is only performed as demand, or can not be performed past the top of a page. This is because managing the number of lines from a top line of a continuous paper such as a fanfold paper to a current printing line is not performed, or because it is performed only in reference to the top of each page during printing, and limited to a page being currently printed. In the former case, when a reverse paper feed operation which exceeds the top line of the page must be performed during printing on a fanfold paper, it is performed regardless of the top line of any page. As a result, the top line of the fanfold paper, i.e., the top line of the first page of the fanfold paper is not checked. Therefore, when a reverse paper feed request is supplied, the fanfold paper is reverse fed past its top line, and is thereby released from the printing apparatus.

SUMMARY OF THE INVENTION

The present invention has been made in view of the above and has as its object to provide a method by means of which a feed operation for a continuous paper can be effectively performed by managing the number of line from a start line of the continuous paper to a current printing position, and a printing apparatus for realizing the method.

In order to achieve this and other objects, the printing apparatus includes a feed controller for initializing total feed data stored in a memory in response to an initialize instruction input thereto. The total feed data indicates a total number of lines to be totally fed and a direction to be fed. The controller updates the total feed data by feed data each time a feed instruction is input thereto. The feed data is designated by the feed instruction and indicates the number of lines to be fed and a direction to be fed. The controller supplies the feed execution instruction to a feed unit in response to a printing instruction input thereto. The feed unit is responsive to a feed execution instruction input thereto and feeds a continuous paper such as a fanfold paper in accordance with the total feed data and resets the total feed data when the continuous paper is fed.

In another aspect, the invention comprises a method including the steps of resetting total feed data stored in a memory in response to a reset instruction, the total feed data indicating a total number of lines to be totally fed and a direction to be fed; updating the total feed data by feed data in accordance with a feed instruction, the feed data being designated by the feed instruction and indicating the number of lines to be fed and a direction to be fed; feeding the continuous paper in accordance with the total feed data in response to a feed execution instruction; generating the feed execution instruction in response to a printing instruction; and generating the reset instruction when the continuous paper is fed.

As described above, according to the present invention, management of a printing line is performed. Thereby, even when an instruction is supplied for reverse paper feed which will exceed the top line of the paper, paper feed can be stopped at the top line of the sheet, thereby preventing the sheet from being released from the printing apparatus. In addition, when an alarm treatment or generating unit is provided, a user can be alerted to an instruction for reverse paper feed which will exceed the top line of the paper before printing.

BRIEF DESCRIPTION OF THE DRAWINGS

The accompanying drawings will be described briefly below.

DETAILED DESCRIPTION OF THE PREFERRED EMBODIMENTS

A printing apparatus according to an embodiment of the present invention will be described in detail with reference to the accompanying drawings.

Figure 1:
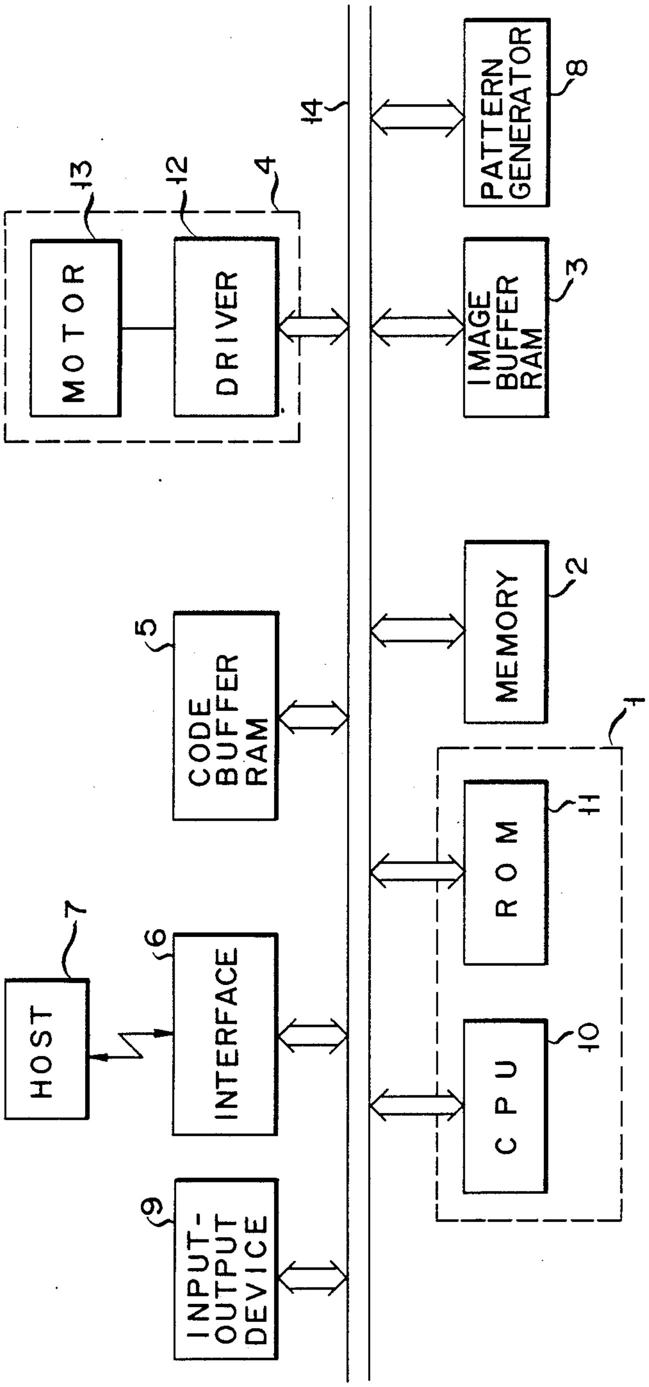
FIG. 1 is a block diagram showing a configuration of a printing apparatus according to an embodiment of the present invention.

The configuration of the embodiment will first be described with reference to FIG. 1. The printing apparatus of the present invention comprises paper feed controller 1 for performing control of the entire apparatus including paper feed control, memory 2 for storing control data, image buffer RAM 3 for storing pattern data to be printed, paper feed executing section 4 for performing a feed operation of a fanfold paper, interface 6 for receiving various instructions and printing data from external host unit 7, code buffer RAM 5 for temporarily storing input data, pattern generator 8 for generating pattern data corresponding to input printing data, i.e., character code data, input-output device 9, and system bus 14. Controller 1 comprises ROM 11 storing a control program and CPU 10 for controlling the respective units in accordance with the control program, and for reading data needed for control from memory 2 and writing the data in memory 2. Section 4 comprises motor 13, and driver 12 for driving motor 13 in response to a paper feed execution instruction.

The operation of this embodiment will be described with reference to FIG. 2. When the apparatus is turned ON, i.e., when an on-line set key for forming a communication channel between unit 7 and CPU 10 through interface 6 of device 9 is depressed, the apparatus is set in an on-line mode (step S1). In step S2, conditions required for printing and paper feed,, operations are initialized. With the paper feed operation, total feed data D representing a totally requested paper feed amount is reset to 0. Also, expected line data A representing the number of lines from the first line of the first sheet of paper to line expected after the feed operation is performed in accordance with data D, data M representing the current page number, and data L representing the current line on the current page are reset to 1. Further, data K representing the number of lines in one page is set to a predetermined value. These data D, A, L, M, and K are stored at predetermined addresses in memory 2. In step S3, code data supplied to the apparatus is decoded. The code data is supplied from unit 7 to buffer 5 through interface 6, and is temporarily stored in buffer 5 by CPU 10. CPU 10 reads out and decodes one-byte data from buffer 5. If the original code data has a plurality of bytes, the read operation is performed, and decoding is performed when the code data has been read completely.

When it is determined by CPU 10 in step S3 that the code data is an instruction for setting the number of lines for one page, step S4 is executed, in which data K is set to correspond to the input data and is stored in memory 2. When it is determined by CPU 10 in step S3 that the code data is data to be printed, step S5 is executed. In step S5, when the data to be printed is character code data, the character code data read from buffer 5 by CPU 10 is supplied to generator 8, converted to pattern data thereby, and is stored in buffer 3. When the data to be printed is graphic data, it is supplied directly to buffer 3 and stored therein.

When it is determined by CPU 10 in step S3 that the input code data is a paper feed instruction, step S6 is executed. In step S6, data B representing paper feed amount and direction is determined based on the instruction. For example, the paper feed instruction can be LF as a code for feeding the fanfold paper forward by one line, <esc>LF as a code for feeding the paper in a reverse direction by one line, FF as a code for feeding the paper to the top line of the next page, and <esc>FF as a code for reverse feeding the paper back to the top line of the current or a preceding page. Therefore, data B representing the instructed paper feed amount and direction is determined in the following manner in accordance with the type of input instruction: when LF is input, data B becomes 1; when <esc>LF is input, data B is −1; and when FF is input, data B is set to feed the paper to the top line of the next page. More specifically, data K representing the number of lines in one page, data L representing the current line position on the current page, and data M representing the current page number are read out from memory 2, and $K-L+1$ is calculated, thereby obtaining data B representing the instructed paper feed amount and direction. Data L becomes 1, data M is incremented by 1, and both are stored in memory 2. When the input instruction is <esc>FF, data K, L and M are read out from memory 2 in the same manner as for instruction FF, and it is checked whether or not data $L=1$. If YES, data B becomes $-K$, data L remains the same, and data M is decremented by 1. If NO, data B becomes $-L+1$, data L becomes 1, and data M remains the same. Data B representing the instructed paper feed amount and direction is calculated in this manner. Thereafter, data M and L are written in memory 2 by CPU 10.

Next, it is checked in step S21 whether execution of the input paper feed instruction is possible. More specifically, data A is read from memory 2 by CPU 10 and is compared with data B. In other words, data A and B are added and it is checked whether or not the addition result is greater than 0. If YES in step S21, step S22 is executed, in which data C is updated to data B. Data D is read from memory 2 by CPU 10 in step S25, and data C determined in step S22 is added thereto. Data D is then stored again in memory 2 by CPU 10. In step S26, data A is read from memory 2 by CPU 10, and data C is added thereto. Data A is then stored again in memory 2 by CPU 10. Data A is updated in this manner without executing the paper feed operation from a printing instruction. When a printing instruction is not input and paper feed instructions are input sequentially, these steps are repeated. Therefore, data A represents not the line position at which the latest printing instruction was executed, but substantially represents the number of lines from the first line of the fanfold paper to a predicted line position after the input paper feed instruction was executed. Thus, when paper feed instructions are repeatedly supplied, data A can become 0.

If NO in step S21, step S23 is executed, and data C is set to be equal to readout data A. Step S25 is then executed. In this case, step S24 can be executed in place of step S23, or step S24 can be executed immediately after step S23. In step S24, CPU 10 switches the apparatus to an off-line mode, and at least one of the following is executed: CPU 10 generates an alarm signal; interface 6 alerts unit 7 in response to the alarm signal; and CPU 10 supplies the alarm signal to device 9 so that the user is alerted by an LED or a buzzer.

When it is determined by CPU 10 in step S3 that the input code is a printing instruction, step S7 is executed. In step S7, data D is read from memory 2 by CPU 10, and whether data D is 0 or not is checked. If YES, i.e., when a paper feed instruction is substantially not supplied, step S10 is executed, pattern data is read from buffer 3, and the printing operation is performed. When data D is not 0 in step S7, i.e., when a paper feed instruction is supplied, CPU 10 supplies the paper feed execution instruction and data D to driver 12 in step S8. Driver 12 drives motor 13 to execute the paper feed operation in step S9. Thereafter, the printing operation is executed in step S10. After the printing operation, step S11 is executed, and 0 for data D is written in memory 2 by CPU 10.

When processing is completed in accordance with the result of step S3 in the manner described above, step S12 is executed. It is checked in step S12 whether the apparatus is set in an off-line mode. If YES, operation is stopped. If NO, step S3 is executed again.

Another embodiment of the present invention will be described in detail with reference to FIG. 3.

Figure 2:
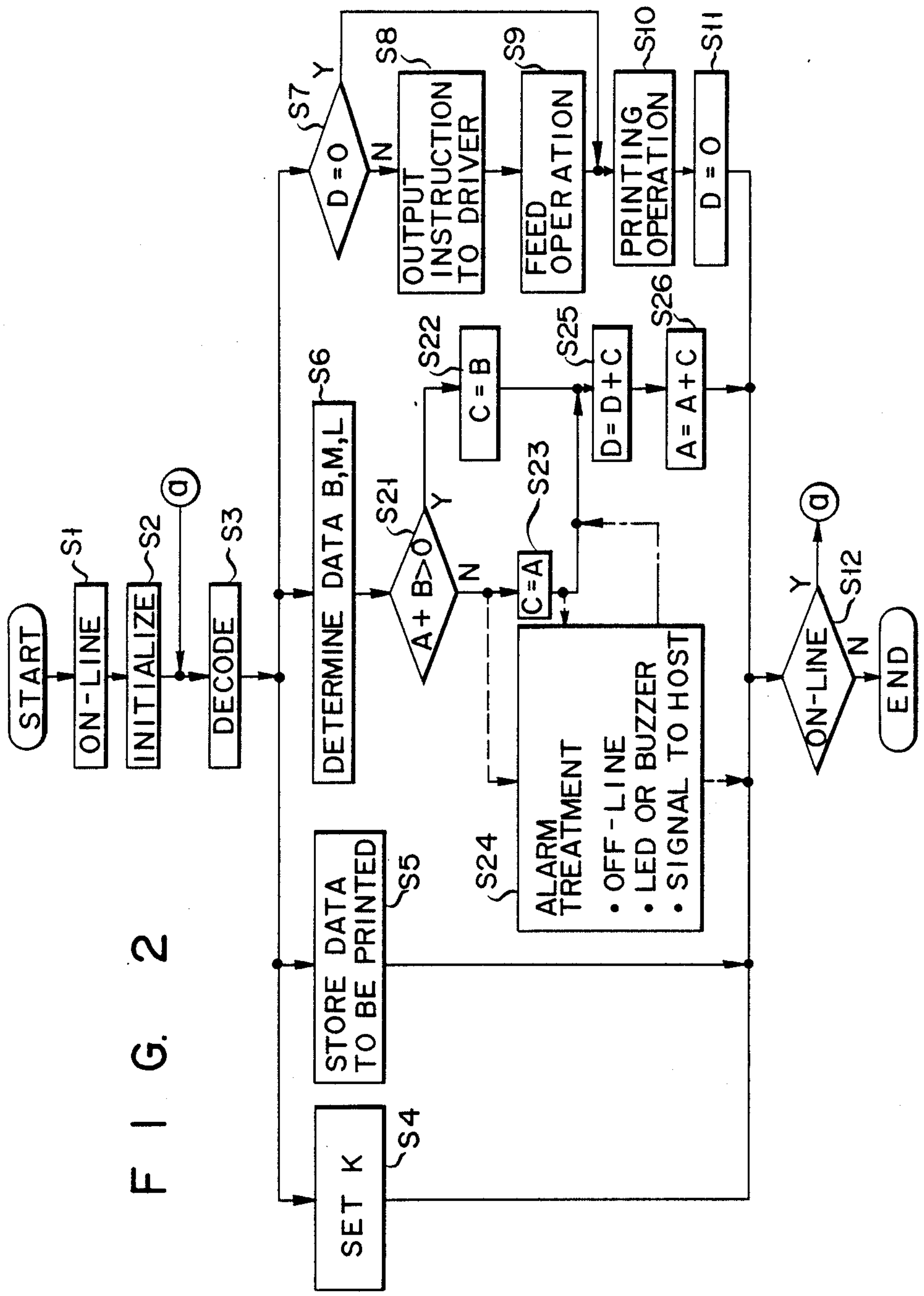
FIG. 2 is a flow chart for explaining an operation of the embodiment with the configuration shown in FIG. 1.
Figure 3:
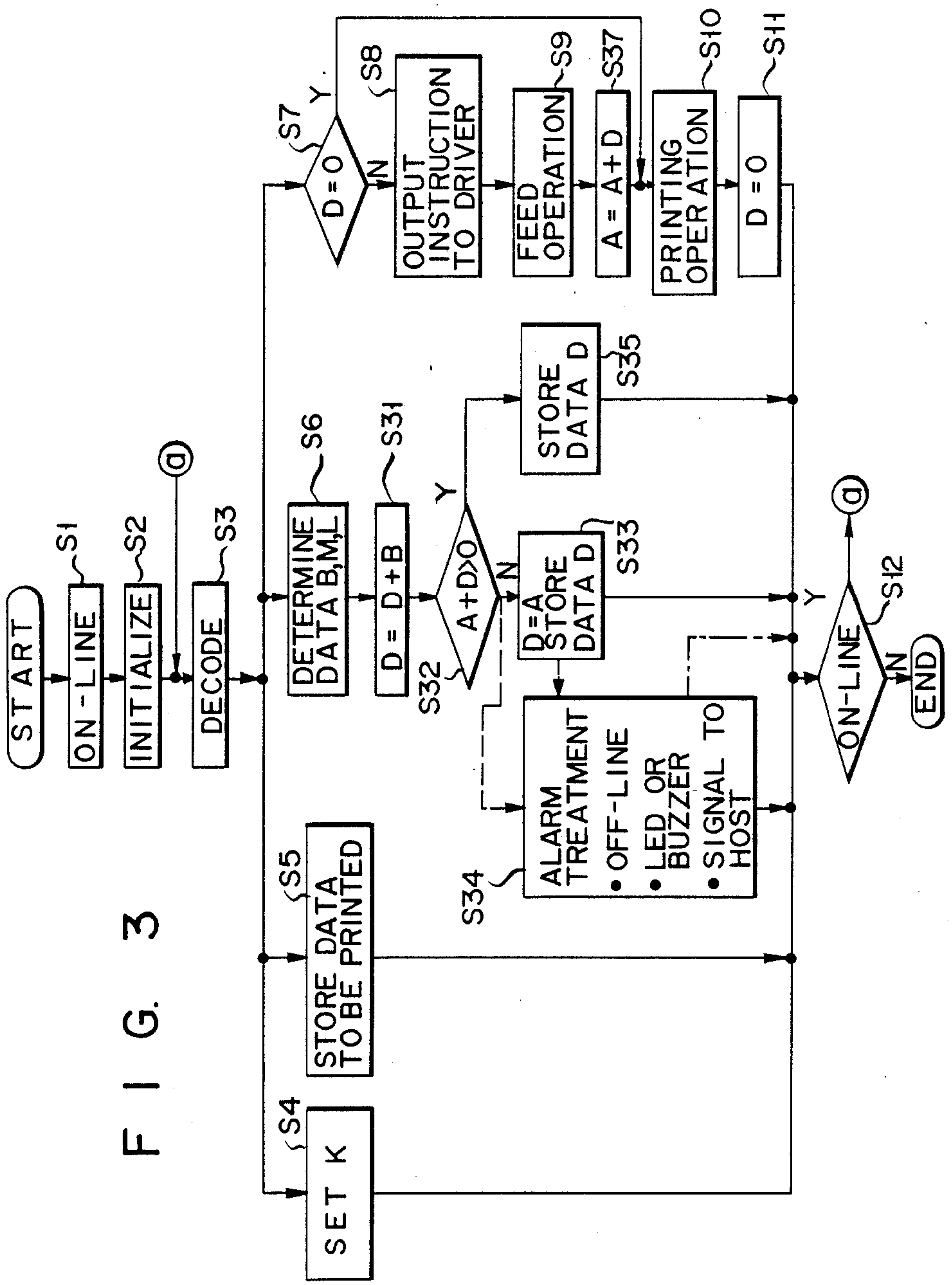
FIG. 3 is a modification of the flow chart of FIG. 2.

In the flow chart of FIG. 3, same step numbers are used to indicate the same operations of the steps of the flow chart in FIG. 2 and a detailed description thereof is omitted.

When it is determined by CPU 10 in step S3 that the input code is a paper feed instruction, step S6 is executed. In step S6, data B is determined bu CPU 10 in the same manner as described above. Next, step S31 is executed to read data D from memory 2 by CPU 10, and data D is added to data B to obtain updated data D. Then, data A is read from memory 2 by CPU 10 in step S32. Readout data A is compared with updated data D to check whether execution of the input paper feed instruction is possible. In other words, it is checked in step S32 whether $A+D$ is greater than 0. In the flow chart of FIG. 3, data A is not updated until a printing instruction is executed. Therefore, in steps concerning paper feed instruction, data A represents the number of lines from the first line of the fanfold paper to the current line.

If YES in step S32, data D is stored again in memory 2 by CPU 10. If NO in step S32, data D is set to be equal to data A, and is stored in memory 2 by CPU 10.

A subroutine of step S34 can be provided so that if NO in step S32, the same alarm treatment is performed in the same manner as in step S24 of the flow chart in FIG. 2. In this case, step S33 can be replaced with step S24 of FIG. 2, or step S34 can be executed sequentially after step S33.

When the input code is confirmed as a printing instruction in step S3, after the same operation as in step S9 of the embodiment in FIG. 2 is performed, data A is read out by CPU 10 before step S10, is added to data D, and the result is stored as data A in memory 2. In this manner, printing instruction is executed and data A is updated.

In the explanation of above two embodiments, driver 12 drives motor 13 in accordance with a paper feed execution instruction from CPU 10, thereby executing the paper feed operation. In other words, motor 13 was used to perform the paper feed operation. However, if attentions is given to the movement direction, motor 13 can also move the printing head, thereby providing the same effect as the present invention.

What is claimed is:

1. A printing apparatus which performs a feed operation for a continuous paper, comprising:

memory means for storing total feed data indicating a total number of lines to be totally fed from a current printing line and a direction to be fed;

feed means responsive to a feed execution instruction for feeding the continuous paper from said current printing line to a line expected in accordance with the total feed data received by said feed means, said line expected being a line number indicating the number of lines from the first line of the continuous paper to the line number after feeding in accordance with said total feed data; and feed control means coupled to said memory means and said feed means, for updating said total feed data by feed data in accordance with a feed instruction received by said feed control means, said feed data being designated by said feed instruction and indicating the number of lines to be fed and a direction to be fed, for reading out the total feed data from said memory means, for supplying said feed execution instruction together with the total feed data to said feed means in response to a printing instruction input to said feed control means and for resetting the total feed data in the memory means after said feed execution instruction is supplied to said feed means.

2. The apparatus according to claim 1, wherein said feed control means further comprises checking means for comparing, in response to said feed instruction, said line expected to a first line of a first page of the continuous paper and for detecting the condition of said line expected being located on the continuous paper.

3. The apparatus according to claim 2, wherein said memory means further comprises second memory means for storing expected line data corresponding to said line expected, said feed control means further comprises updating means for updating said expected line data by said feed data in response to said feed instruction, and said checking means.

4. The apparatus according to claim 2, wherein said memory means further comprises second memory means for storing current line data, said feed control means further comprises updating means for updating the current printing line data in accordance with the total feed data in response to the printing instruction, the line data indicating the number of lines from the first line to a current printing line, and said checking means includes means for comparing in accordance with the total feed data and the feed data the current printing line to the first line of the continuous paper, and for detecting the condition of said current printing line being located on the continuous paper.

5. The apparatus according to claim 4, wherein said feed control means further comprises setting means for setting current printing line data to the total feed data at times when the condition of said current printing line being located on the continuous paper is not detected.

6. The apparatus according to claim 2, wherein said feed control means further comprises alarm signal generating means for generating an alarm signal at times when the condition of said current printing line being located on the continuous paper is not detected.

7. The apparatus according to claim 6, wherein said feed control means further comprises means for outputting the alarm signal to an external apparatus.

8. The apparatus according to claim 6, wherein said feed control means further comprises means for driving an indicator device in accordance with the alarm signal.

9. A printing apparatus managing a line position when a continuous paper is fed, comprising:

memory means for storing total feed data indicating a total number of lines to be totally fed and a direction to be fed;

feed means responsive to a feed execution instruction for feeding the continuous paper in accordance with the total feed data input thereto; and feed control means coupled to said memory means and said feed means, for checking, in response to a feed instruction input thereto, whether or not a line expected when the continuous paper is fed in accordance with the total feed data, passes over a first line of a first page of the continuous paper, for supplying the feed execution instruction to said feed means in response to a printing instruction input thereto, and for resetting the total feed data in said memory means after the total feed data is input to said feed means.

10. The apparatus according to claim 9, wherein said feed control means further comprises alarm signal generating means for generating an alarm signal when it is determined that the expected line passes over the first line.

11. The apparatus according to claim 10, wherein said feed control means further comprises means for outputting the alarm signal to an external apparatus.

12. The apparatus according to claim 10, wherein said feed control means further comprises means for driving an indicator device in accordance with the alarm signal.

13. A method of effectively performing a feed operation for a continuous paper from a current line on the continuous paper, comprising:

resetting total feed data stored in a memory in response to a reset instruction, the total feed data indicating a total number of lines to be totally fed and a direction to be fed;

updating the total feed data by feed data in accordance with a feed instruction, the feed data being designated by the feed instruction;

feeding the continuous paper in accordance with the total feed data in response to a feed execution instruction to a line expected, said line expected being a line number indicating the number of lines from the first line of the continuous paper to a line number after feeding in accordance with said total feed data;

generating the feed execution instruction in response to a printing instruction; and generating another reset instruction after the continuous paper is fed.

14. The method according to claim 13, further comprising checking, in response to the feed instruction, whether a line expected passes over a first line of a first page of the continuous paper when the continuous paper is fed in accordance with the total feed data.

15. The method according to claim 14, further comprising updating expected line data stored in the memory by the feed data in response to the feed instruction, the expected line data indicating the number of lines from the start line to a current printing line when the continuous paper is fed by said feed means, and wherein said checking includes checking, from the expected line data and the feed data, whether or not the expected line passes over the first line.

16. The method according to claim 15, further comprising storing, in the memory, data indicating the number of lines from the current printing line to the start line as the total feed data and clearing the expected line data when it is determined that the expected line passes over the start line.

17. The method according to claim 15, further comprising performing an error processing when it is determined that the expected line passes over the first line.

18. The method according to claim 14, further comprising updating line data stored in the memory by the total feed data in response to the printing instruction, the line data indicating the number of lines from the first line to a current printing line, and said checking includes checking, from the total feed data and the feed data, whether or not the expected line passes over the start line.

19. The method according to claim 18, further comprising storing, in the memory, data indicating the number of lines from the current printing line to the first line as the total feed data when it is determined that the expected line passes over the first line.

* * * * *